Patented Feb. 16, 1943

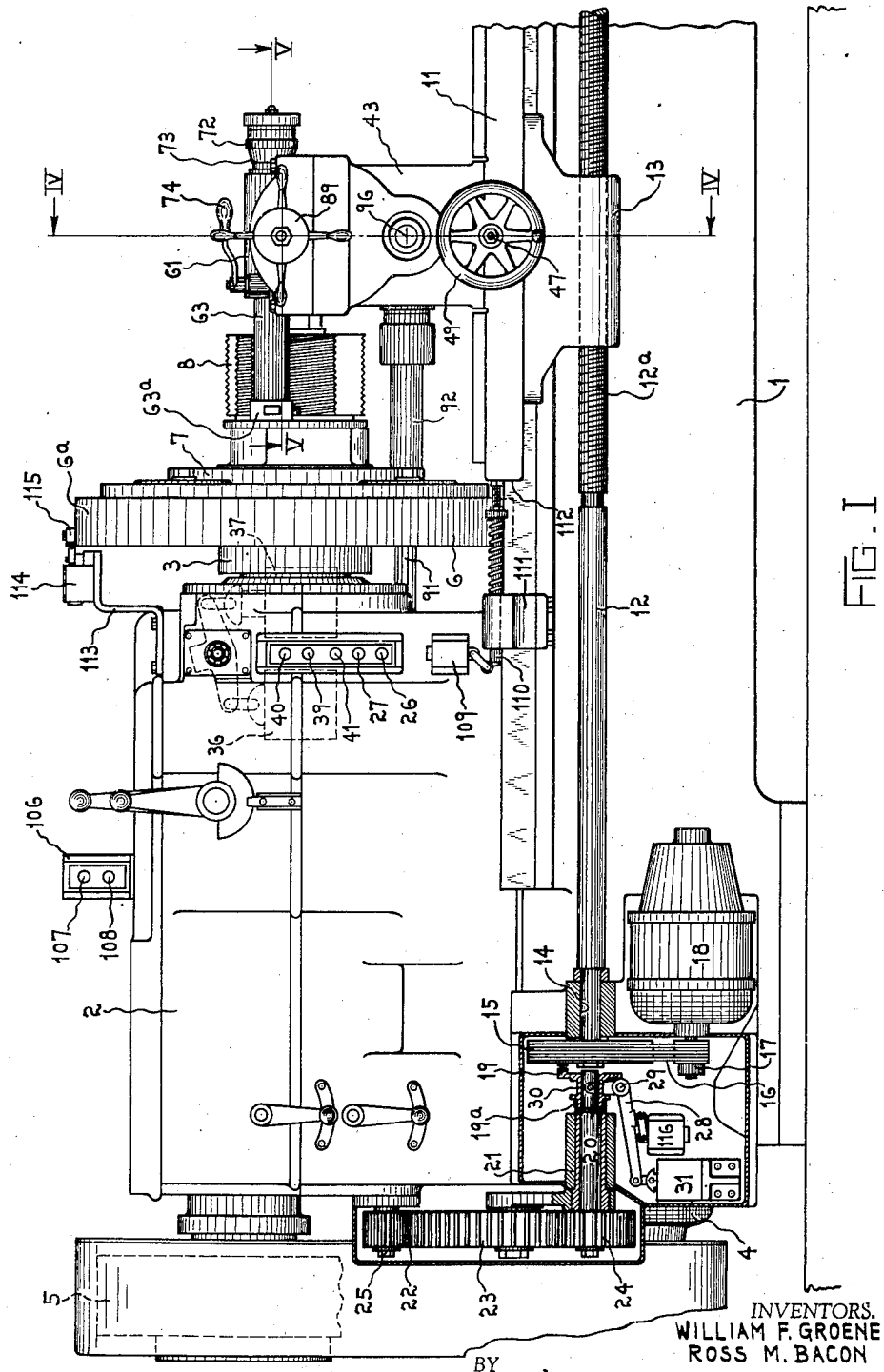
FIG. I
INVENTORS.
WILLIAM F. GROENE
ROSS M. BACON
BY Willard L. Groene

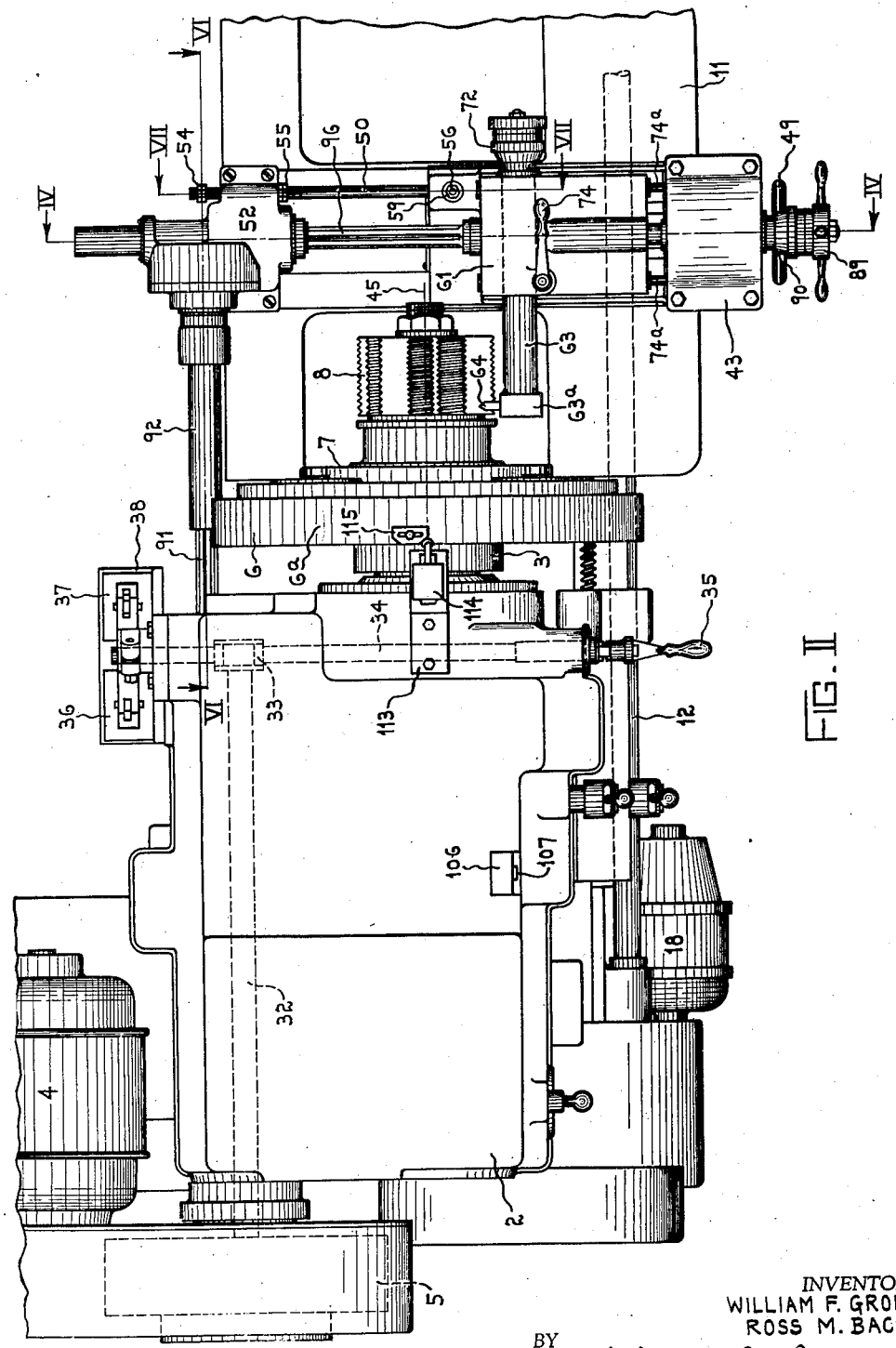
FIG. II

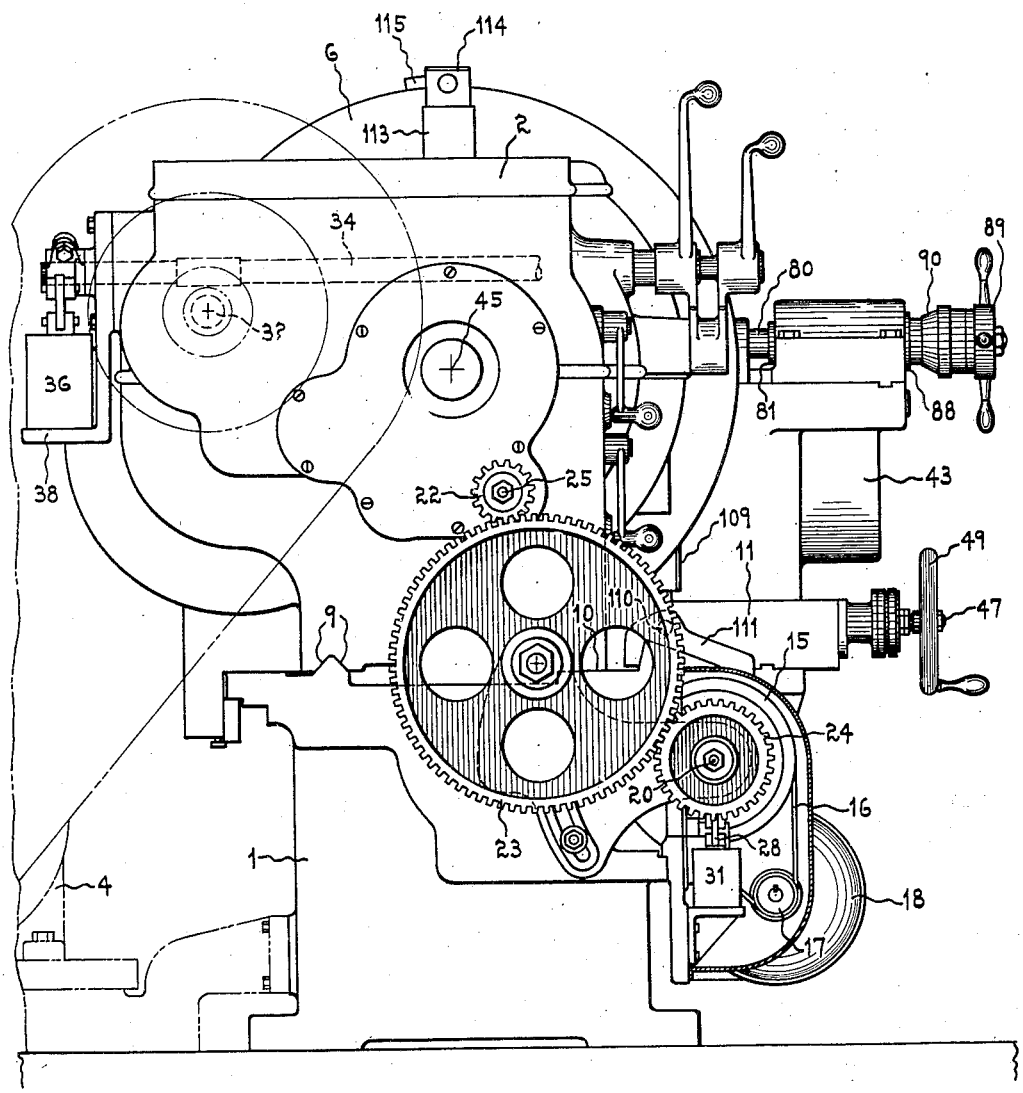
FIG. III

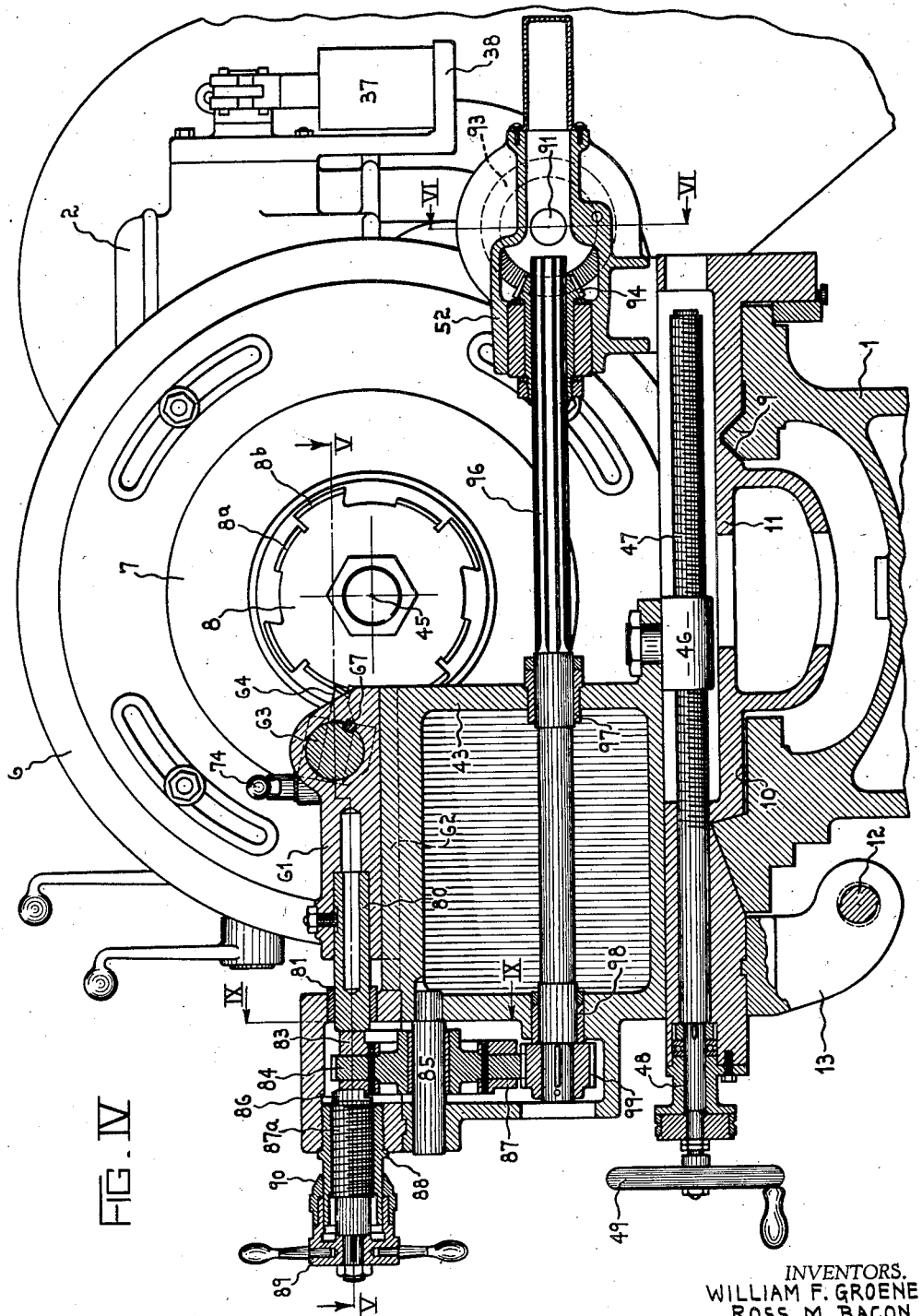

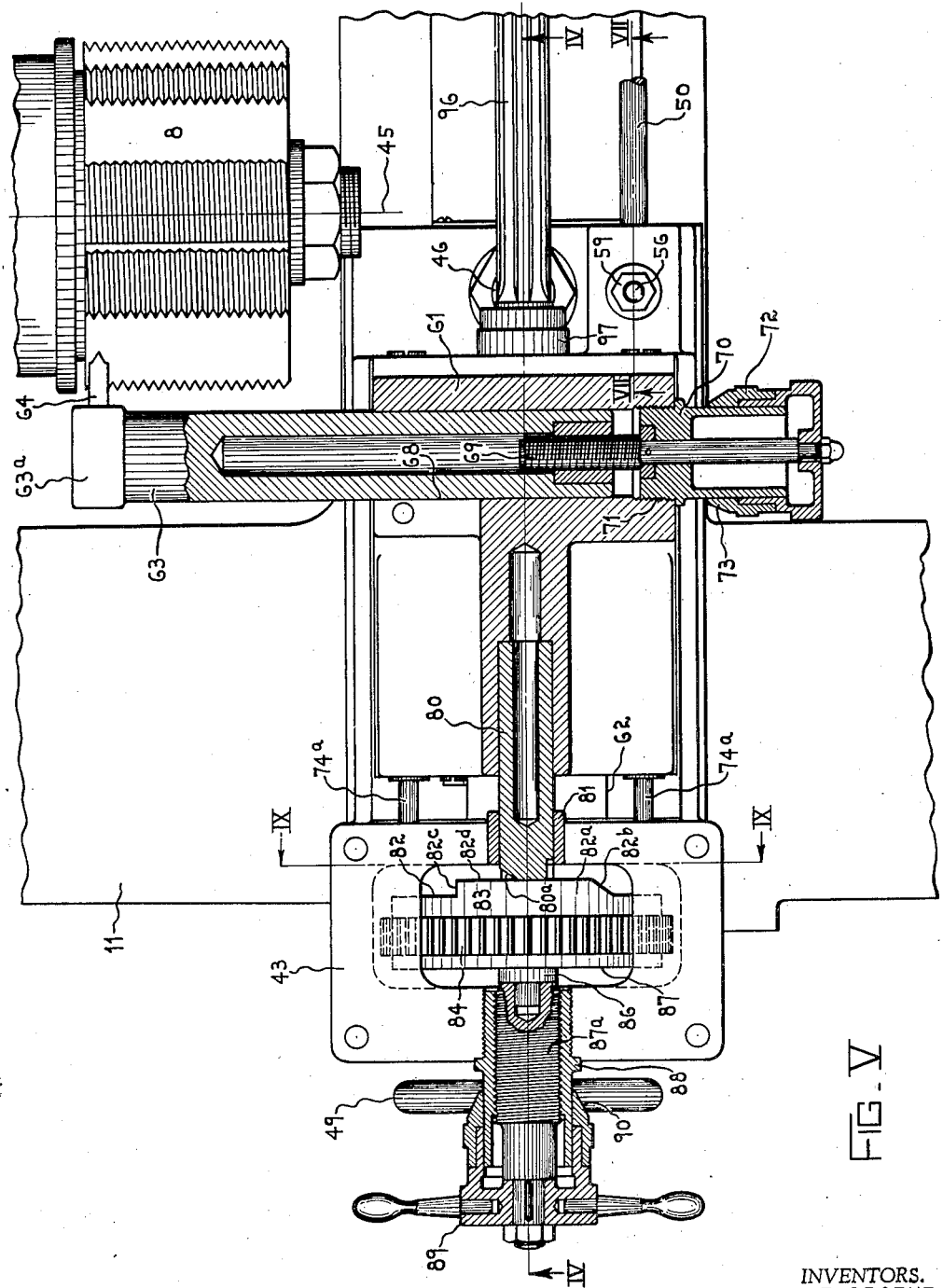

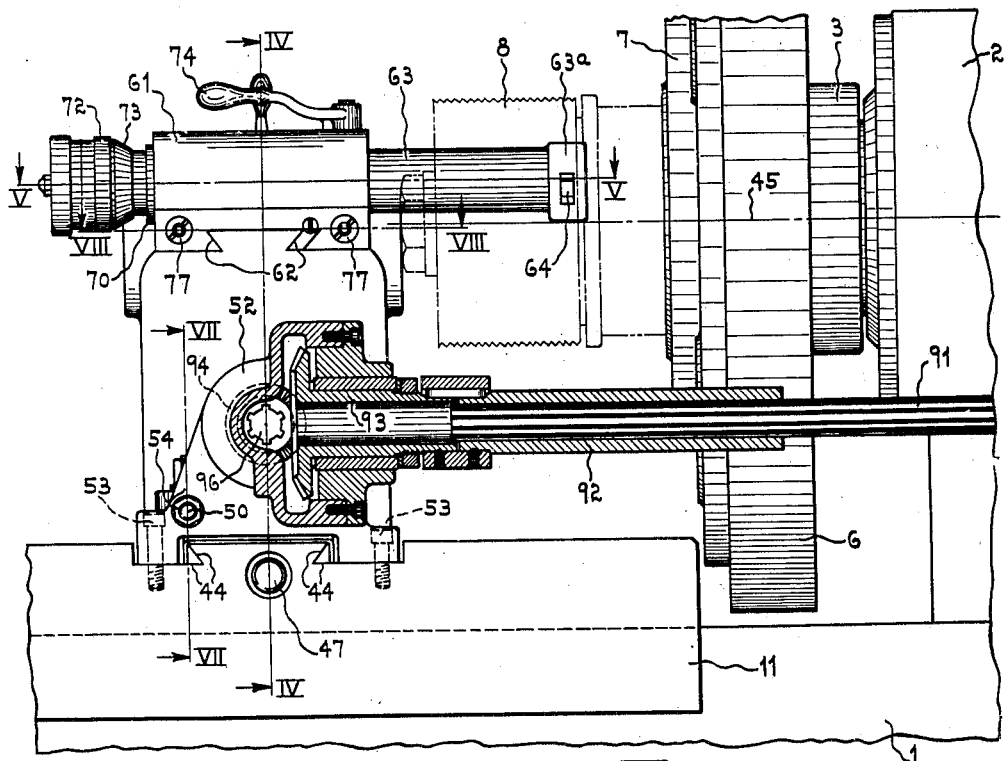
FIG. VI
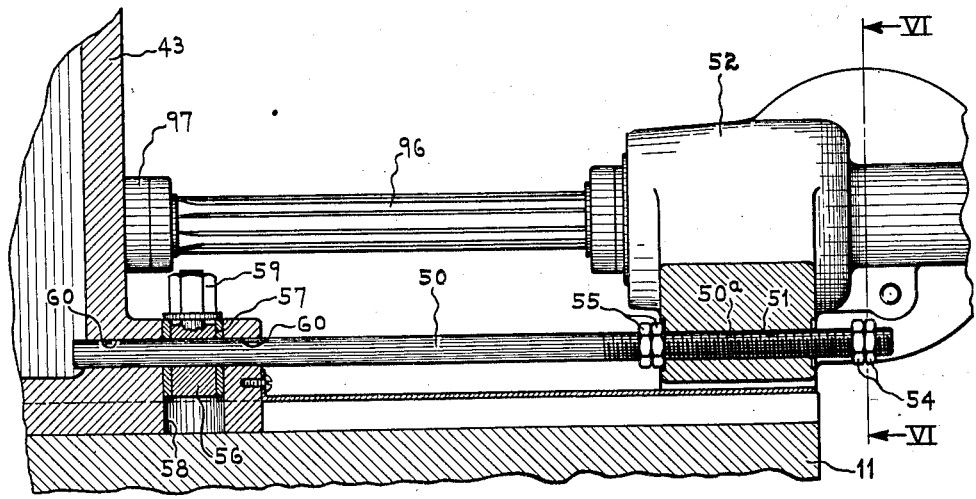
FIG. VII

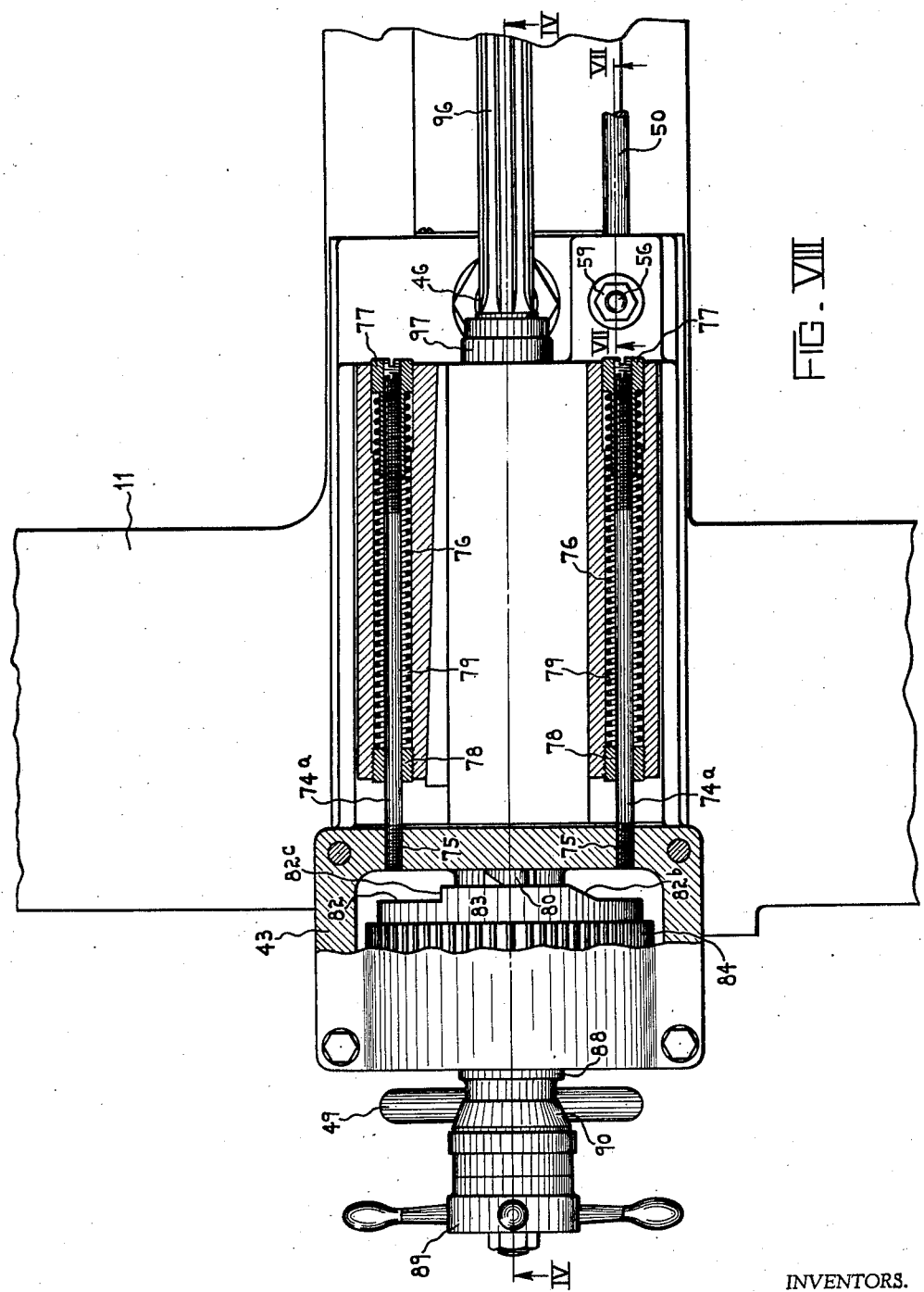

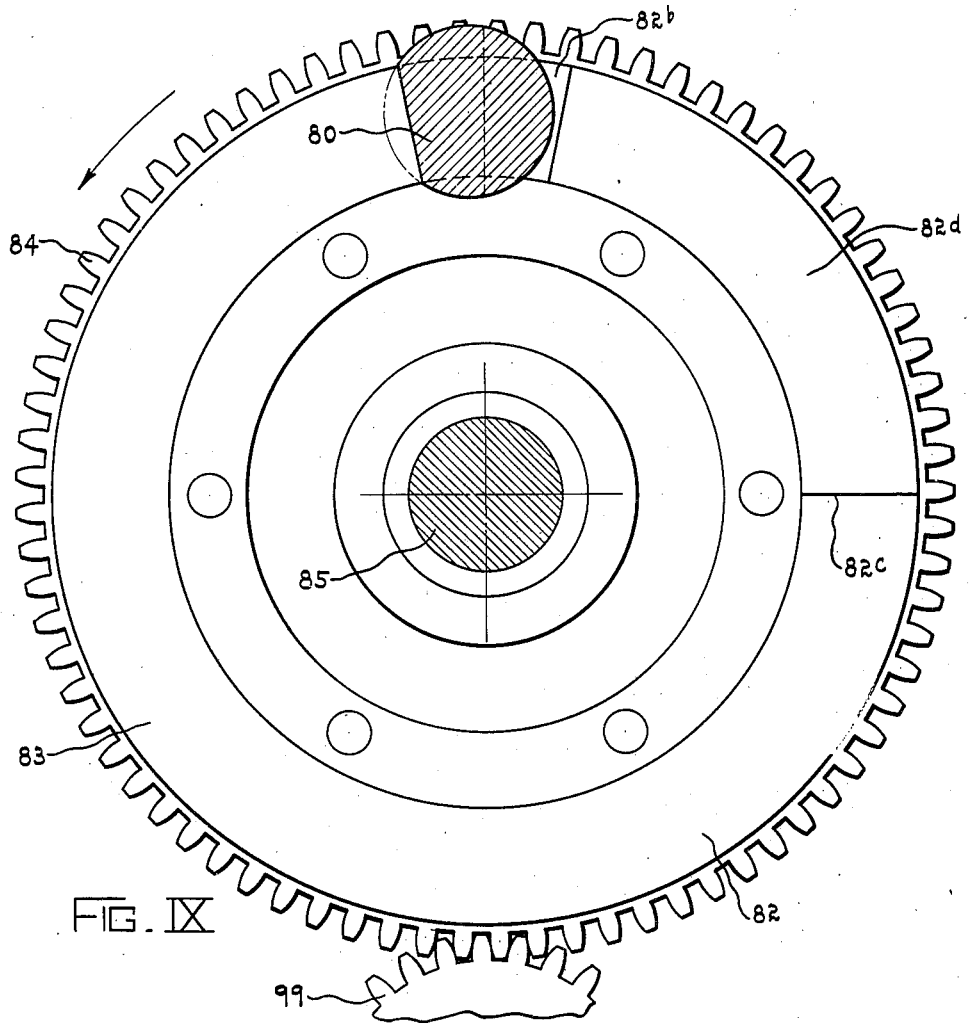
FIG. IX
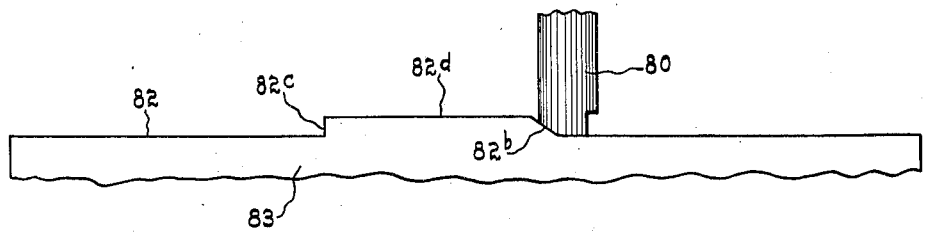
FIG. X

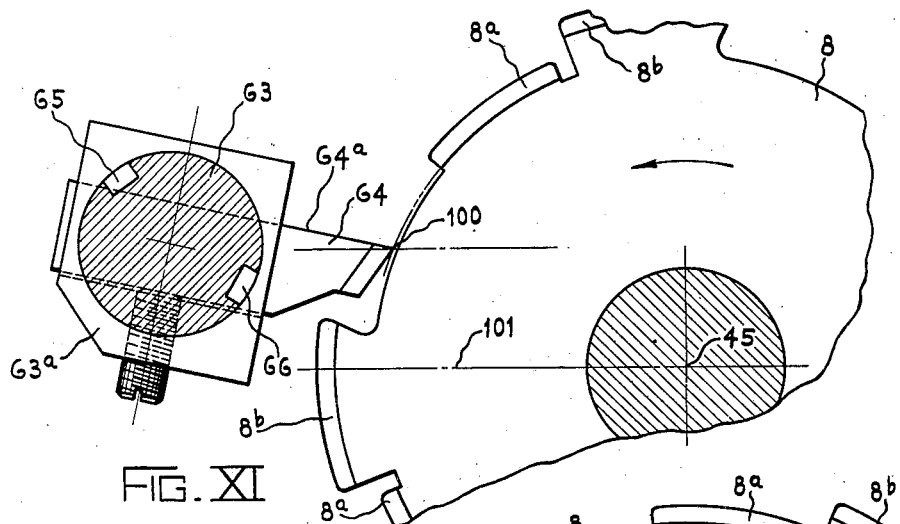
FIG. XI
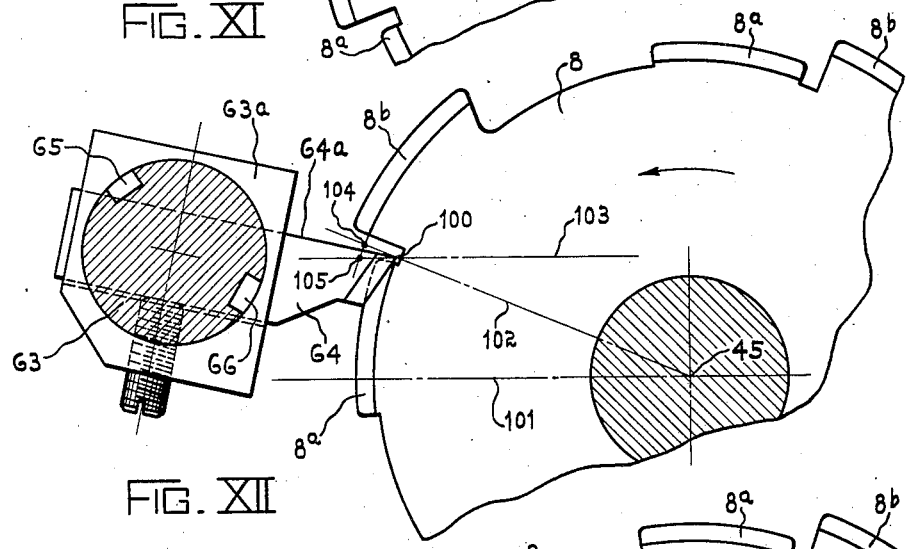
FIG. XII
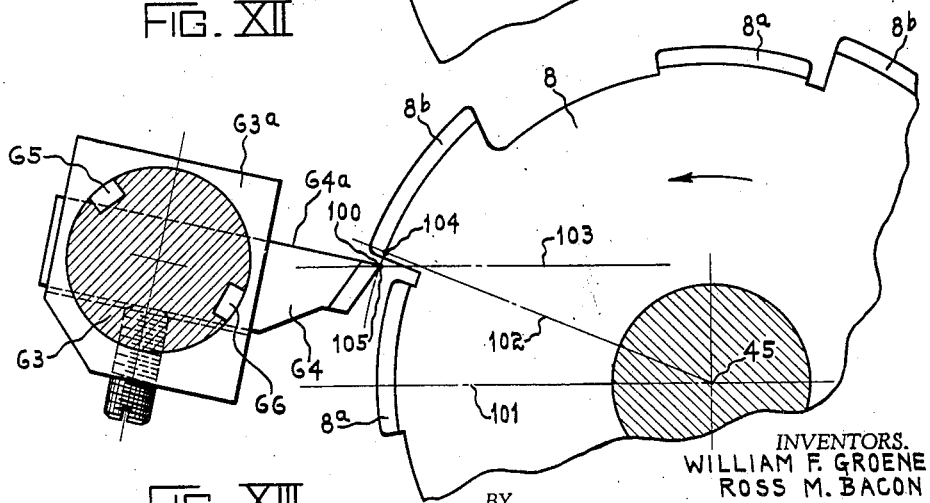
FIG. XIII

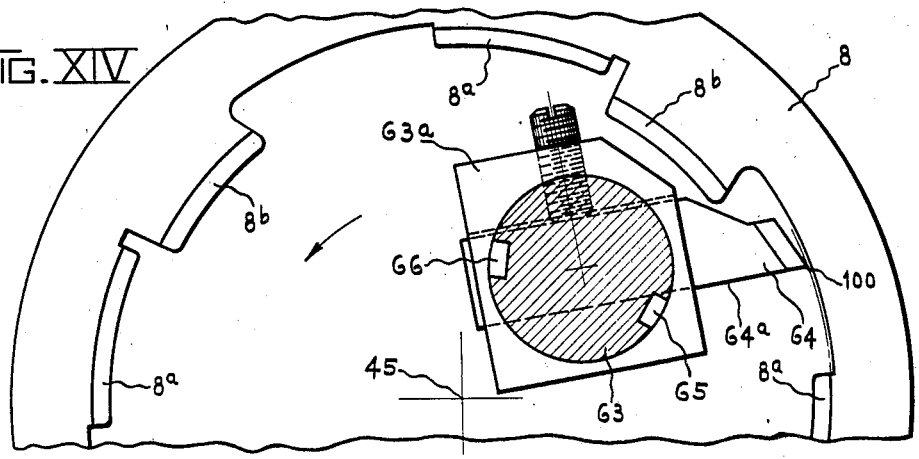
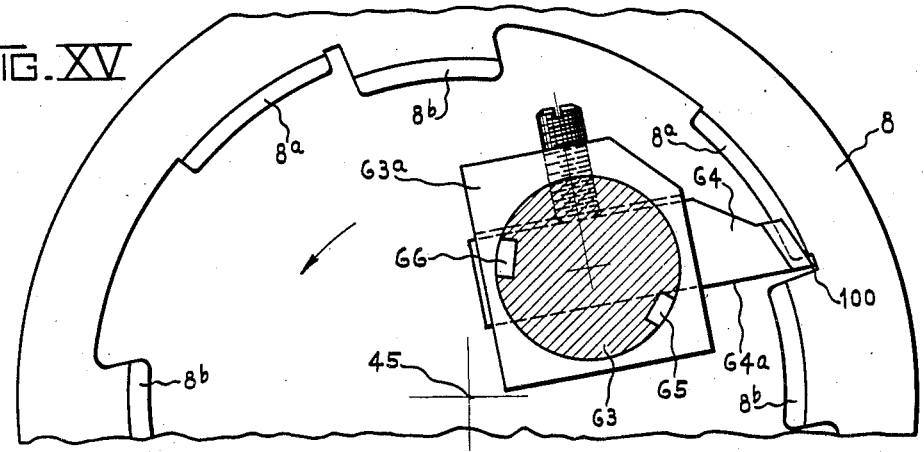
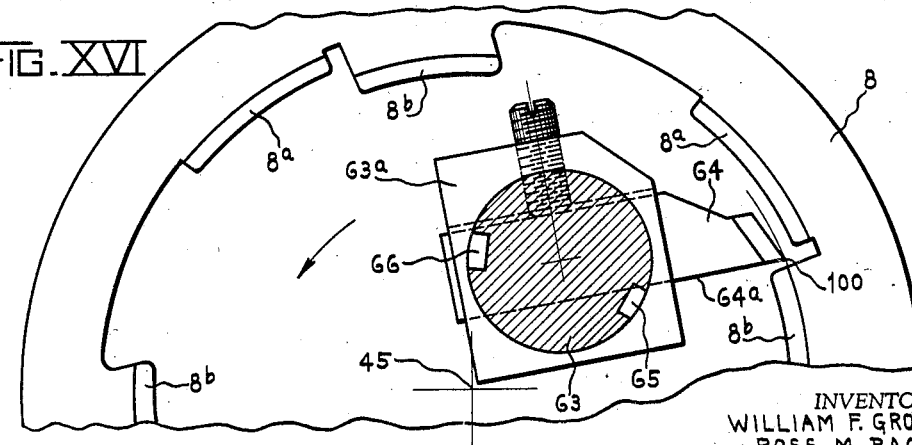

2,311,591

UNITED STATES PATENT OFFICE 2,311,591

STEP THREADING MECHANISM

William F. Groene and Ross M. Bacon, Cincinnati, Ohio, assignors to The R. K. Le Blond Machine Tool Company, Cincinnati, Ohio, a corporation of Delaware Application April 7, 1941, Serial No. 387,248

9 Claims. (Cl. 10—101)

This invention pertains to step threading mechanism for use in conjunction with lathes and is particularly related to a step threading attachment for engine lathe which is adapted to machining or chasing both external and internal stepped threads on work such, for example, as breach blocks and breach rings for guns. More particularly this invention pertains to improvements in step threading mechanism whereby the production of such apparatus is greatly increased and wherein is combined ease and accuracy of operation with greatly minimized effort on the part of the operator in controlling the apparatus.

One of the chief objects of this invention is to provide automatic power operated feed and rapid traverse mechanism for actuating the chasing tool in feed and rapid traverse movements in such a way that the chasing tool is always maintained in proper position relative to the threads being chased as it is successively passed over the threads at increasing depths of cut.

Another object of this invention is to provide, in conjunction with such actuating mechanism for the chasing tool, means for automatically and accurately stopping the work spindle in proper position at the end of each chasing cut so that the chasing tool may be fed up closely to a shoulder at the end of the thread or stop it in a drilled hole or other clearance hole at the end of the chasing cut. It is a further object in connection with this apparatus that this automatic stopping takes place without effort and skill upon the part of the operator while at the same time providing automatic and much more rapid means for effecting the proper stopping of the chasing tool and work spindle at the end of each chasing cut.

Another object is to provide a unique tool bar support having accurate adjustment and movement parallel with the direction of feeding of the chasing tool relative to these threads to be cut, so as to effect very accurate setting of the chasing tool in proper lead position longitudinally of the work being chased.

Another object of this invention is to set the cutting tool a considerable distance above the center line of the lathe, the purpose for this being to provide more jumping clearance for the tool to clear the threads while chasing. With this arrangement, the tool clearance is increased approximately 50 percent greater than by setting the tool in the conventional manner on the center line of the lathe. As a result, the spindle speed of the machine can be increased to thereby greatly increase the productive output of the machine.

A further object is also to provide means for accurately positioning and limiting the cross movement of the step threading attachment when rapidly removing the cutting tool radially away from the work as it is traversed back to a new starting position.

And again another feature is to provide a unique tool bar, carrying the chasing tool, which may be readily adapted for both internal or external positioning of the tool for internal and external step threading.

Further features and advantages of this invention will appear from the detailed description of the drawings in which:

Figure I is a front elevational view of a modified engine lathe incorporating the step threading mechanism of this invention.

Figure II is a plan view of the apparatus shown in Figure I.

Figure III is a left hand end elevation of the machine of Figures I and II particularly showing the driving gearing for the feed and rapid traverse screw for actuating the step threading attachment longitudinally of the lathe bed.

Figure IV is a vertical transverse section through the machine and step threading attachment on the line IV—IV of Figures I, II, V, VI, and VIII.

Figure V is a horizontal fragmentary sectional view through the attachment on the line V—V of Figures I, IV, and VI.

Figure VI is a vertical sectional view from the rear of the step threading attachment shown on the line VI—VI of Figures II, IV, and VII.

Figure VII is a fragmentary sectional view on the line VII—VII of Figures II, V, and VIII, particularly showing the cross stop mechanism for controlling the radial movement of the attachment to and from the work by the cross feed hand wheel operating mechanism.

Figure VIII is a fragmentary horizontal section through the reciprocating tool slide shown on the line VIII—VIII of Figure VI.

Figure IX is a fragmentary section showing the actuating gear cam indicated by the line IX—IX in Figures IV and V.

Figure X is a fragmentary view of the actuating lug and associated plunger for effecting the rapid jumping of the cutting tool for effecting the step threading operation.

Figure XI is a fragmentary diagrammatic view of the relationship of the step threading tool and the work at the beginning of the chasing of the smaller diameter thread, in chasing an external step thread.

Figure XII is a view similar to that of Figure XI but showing the position of work and tool at the completion of the cutting of the smaller diameter thread and at the movement the tool is to be stepped outwardly for the larger diameter thread.

Figure XIII is a view similar to Figures XI and XII but showing the position of the tool at the instant it has been fully stepped for movement outwardly to begin the cutting of the larger diameter thread.

Figure XIV shows the relationship of work and tools in cutting an internal step thread with the tool positioned at the beginning of the cutting of the larger diameter internal thread.

Figure XV is a view similar to that of Figure XIV but showing the cutting tool at the completion of the chasing of the larger diameter internal thread.

Figure XVI is a view similar to that of Figures XIV and XV but showing the cutting tool after it has been moved or stepped outwardly and at the beginning of the cutting of the smaller diameter internal thread.

This step threading mechanism is shown applied to a typical engine lathe having a bed 1 upon which is mounted the usual headstock 2 having transmission mechanism for rotating a work spindle 3 journaled in the headstock 2. This headstock transmission is driven by a main drive motor 4 which drives, through suitable belted means, the combined brake and clutch pulley 5 of the type for example as shown in Patent #1,528,973, dated March 10, 1925, connected to the input of the headstock transmission in the conventional manner. On the work spindle 3 is appropriately carried the work face plate 6 which has appropriate chucking mechanism 7 for carrying a work piece 8 to be step threaded.

On the ways 9 and 10 of the bed 1 is slidably mounted the lathe carriage 11 which is arranged to be fed along the bed on the ways by means of the lead and rapid traversing screw 12 which operates in a threaded nut 13 rigidly fixed to the underside of the front portion of the carriage 11. This screw is provided in this particular instance with appropriate threads 12a having the proper lead for its rate of rotation to effect the proper movement of the carriage with relation to the threads 8a and 8b to be cut on the work piece 8. The left hand end of this lead screw 12, Figure I, is journaled in an appropriate bearing 14 against axial movement therein and has fixed on its outer end a driving pulley 15 which is connected by suitable belts 16 to the pulley 17 of the rapid traverse motor 18 mounted on the bed 1 of the lathe. Power from the headstock transmission is connected or disconnected to the lead screw 12 through the medium of a single tooth clutch 19 appropriately slidably mounted on the shaft 20 journaled in an appropriate bearing 21 carried on the bed 1 of the lathe. This shaft 20 is driven through appropriate change gears 22, 23, and 24 from the output shaft 25 of the headstock transmission so that the shaft 20 is at all times positively rotated in direct relationship to the rotation of the work spindle. By use of the single jaw clutch 19, power from the shaft 20 may be connected or disconnected to the lead screw 12 in always the same predetermined relative position, so that no matter when the clutch is disengaged from the lead screw 12, reengagement will always effect the proper orientation of the rotary position of the lead screw with respect to the spindle rotation of the headstock, thereby keeping the threaded portion of the work on the work spindle in prompt relationship to the lead screw and the longitudinal position of the carriage on the lathe bed. The motor 18 is at all times belted to the lead screw 12 and rotates slowly therewith under the influence of driving power from the shaft 20 when clutch 19 is engaged with the lead screw 12, the motor 18 only being energized in one direction or the other for rapid rotation of the lead screw 12 when the clutch 19 is disengaged from the lead screw. Energizing of the rapid traverse motor 18 for rotation in either direction may be electrically effected by the usual electrical control means through the medium of operating the "traverse left" push button 26 or the "traverse right" push button 27 located on the front of the machine as shown in Figure I. Operation of the single tooth clutch 19 is effected by means of the bell crank lever 28 mounted on a suitable shaft 29 fixed in the bed 1 of the machine and which lever has appropriate means operating in the annular groove 30 of the clutch 19 and has its other end suitably connected to a solenoid 31 whereby electrical operation of this solenoid effects engagement or disengagement of the clutch 19 with the lead screw 12.

The stopping and starting of the work spindle 3 is controlled by appropriately operating the combined brake and clutch pulley 5 through the control rod 32 and the yoke 33 on the spindle control rock shaft 34 in the usual manner as shown for example, in Patent #1,528,973, dated March 10, 1925, either by rocking the shaft 34 through the medium of the manual control handle 35, Figure II, or by means of the control solenoids 36 and 37 mounted on the bracket 38 on the rear of the headstock 2. When the solenoid 36 is energized it releases the clutch and causes the brake to operate in the pulley 5 thereby substantially instantly stopping rotation of the work spindle 3. When the solenoid 37 is energized it moves the shifter rod 32 to the left, Figure II, effecting engagement of the clutch and disengagement of the brake in the pulley 5 thereby connecting power from the motor 4 to the headstock transmission to effect rotation of the work spindle 3. Solenoid 36 is rendered operative by contacting the spindle stop push button 39 while the solenoid 37 is rendered operative by actuating the spindle start push button 40, as seen in Figure I. A momentary contact button 41 is provided for effecting intermittent operation of the solenoid 37 for "inching" or slowly bringing the spindle intermittently around to desirable positions for tool setting.

The attachment itself comprises a housing 43, Figure IV, which is slidably mounted on appropriate dove tail guide ways 44 formed on the carriage 11 to permit cross travel movement of the attachment to and from the axis of rotation 45 of the work to be step threaded. Cross travel movement of the housing 43 is effected through the medium of the nut 46 appropriately fixed on the housing 43 in which operates the usual lathe cross feed screw 47 journaled against axial movement in a suitable bearing 48 carried on the front of the carriage 11, the cross feed screw 47 being manually rotatable by means of a suitable cross feed hand wheel 49.

Referring particularly to Figure VII, limitation of this cross travel of the housing 43 is accurately effected by means of the automatic cross stop mechanism shown in this figure. This apparatus comprises a rod 50 having a threaded portion 50a arranged for sliding movement in a bore 51 formed in the bevel gear housing 52 fixed on the rear end of the carriage 11 by suitable screws 53 as best seen in Figure VI. Each side of the bracket 52 are provided pairs of lock nuts 54 and 55 which contact appropriate counterbores formed at each end of the bore 51 in this bracket 52. Thus by appropriately setting the relative position of the lock nuts 54 and 55 a definite limited travel of the rod 50 in the bracket 52 may be accurately effected. This rod 50 may be locked in any relative position on the housing 43 by means of the locking plunger 56 carried in the sleeve 57 in the bore 58 of the housing 43 and it is apparent by appropriately tightening up on the nut 59 on the threaded upper end portion of the plug 56 that the rod 50 will be restricted from movement in the bore 60 of the housing 43, so that as the housing is moved back and forth on the guideways its motions on the guideways will be axially limited by the setting of the various lock nuts 54 and 55. The advantage of this arrangement is that when the housing 43 is moved toward the axis 45 for rotation of the work by means of the handwheel 49, the attachment will be properly set with respect to definite cuts on the work to be step threaded and after the completion of a passage over the work, the hand wheel is rotated in the opposite direction bringing the lock nut 54 into contact with the bracket 52, so as to properly stop the outward movement of the housing 43, when rapid traversing the carriage back to the right away from the work.

On top of the housing 43 is slidably mounted the reciprocating tool slide 61 on suitable dove tail guideways 62 formed in the housing 43. In this reciprocating slide 61, Figure V, is carried the cutting tool supporting bar 63 on the outer end of which is formed cutting tool holding portion 63a in which is mounted the cutting tool 64. This tool bar 63 has a pair of grooves 65 and 66 in which may be entered a key 67 carried in the bore 68 formed in the reciprocating slide 61, so that the tool bar may be set in either the position shown in Figures IX through XIII inclusive for external step threading, or in the position shown in Figures XIV through XVI for internal step threading operation. In both instances it will be noted that the tool is positioned in the same way in the end 63a of the tool bar 63. It will also be noted that the cutting tool is so designed so that its cutting edge and locating surface in the tool bar are the same. That is, the surface 64a is the only surface that need to be ground or redressed for purposes of sharpening the cutting edge of the tool with the result that any grinding or sharpening of the tool has no effect on the proper and accurate positioning of this tool in the tool bar, thereby eliminating all difficulties of resetting the tool after each sharpening.

Longitudinal adjustments of the tool bar 63 in the bore 68 is effected by micrometer adjusting means comprising a screw 69 mounted against axial movement in a bearing sleeve 70 fixed in the bore 68 by suitable threaded connection 71 and which has a graduated knurled rotating barrel 72 fixed thereto whereby the amount of rotation of said screw may be accurately fed from the graduation on the surface 73 of the knurled indicating knob. In this way the cutting tool may be accurately fed longitudinally on the work for exact and precise positioning of the beginning of the thread to be cut thereon. The barrel 63 may be rigidly bound or locked into the bore 68 by means of a suitable clamping arrangement, not shown, by manipulating the usual clamping handle 74.

The reciprocating slide 61 is normally urged away from the work by means of the resilient spring arrangement shown particularly in Figure VIII, which comprises a series of a pair of rods 74a, which have one of their ends fixed in the housing 43 by means of the threaded holes 75. Around these rods 74a are provided compression springs 76 which bear against the threaded abutment bushing 77 fixed on the other end of these rods 74a and which also bear against threaded bushing 78 fixed in the bore 79 formed in the bottom portion of the reciprocating tool slide 61 so that normally the slide 61 is urged away from or to the left as shown in Figures IV, V, and VIII.

This resilient movement of the slide 61 is limited by its abutment plunger 80 which is fixed substantially centrally in this slide 61 and which projects outwardly through the supporting bushing 81 in the housing 43 to contact the cam surface 82 of the circular disc cam 83 carried on the driving gear 84. This driving gear being journaled for free axial movement on a stud 85 fixed in the housing 43. This cam surface 82 is provided with an abutment lug portion 82a having an angular rise portion 82b and a vertical fall portion 82c, as best seen in Figures IX and X and having the parallel portion 82d, so that for each revolution of the gear 84 the lug will pass by the plunger 80 causing its portion 82b to initially engage the angular portion 80a on the plunger 80 causing it to rise up to the inner position toward bringing the cutting tool 64 in position for chasing the thread portion 8a of the work and will maintain the plunger while it is contracting this portion 82d until this portion has been changed. The plunger then rapidly substantially and instantly drops from the portion 82d to the portion 82 over the end 82c bringing the tools instantly into position for chasing the portion 8b of the thread on the work.

Relative positioning of the cutting tool 64 with respect to the axis 45 of rotation of the work is effected by axially moving the cam and gear 84 on its stud 85 by moving the back of shoe 86 which rides against bearing surface 87 on the opposite side of the gear 84 of the cam 82 by means of the accurately adjustable screw 87a upon which it is carried and which screw 87a is appropriately mounted in the threaded bushing 88 fixed in the housing 43. A suitable micrometer adjusting handwheel 89 having a graduated portion 90 may be rotated one way or the other for axially positioning the gear 84 and cam 83 thereby positioning the slide 61 and the cutting tool 64 with respect to the depth of the thread to be cut on the work piece 8. The gear 84 and its cam 83 are rotated in proper synchronous motion with that of the work spindle 3 of the lathe through a driving transmission comprising a splined shaft 92, Figure VI, which is appropriately driven from the headstock transmission in such a way that it rotates in a predetermined rate of rotation to that of the work spindle 3. This shaft 91 is supported in the splined sleeve 92 for axial sliding driving motion, which sleeve 92 in turn is fixed to a bevel gear 93 appropriately journaled in the bevel gear bracket 52 so that the bevel gear 93 may be rotated, at any position of the carriage 11 on the bed 1, from the headstock transmission. The bevel gear 93 in turn drives a bevel pinion 94 journaled in the bevel gear bracket 52 and has mounted in it a sliding splined shaft 96 which is journaled against axial movement in suitable bearings 97 and 98 in the housing 43, so that this shaft 96 may at all times be driven from the headstock transmission for any cross travel position of the housing 43 on the carriage 11 of the lathe. On the front end of the shaft 96 is provided a pinion 99 which is arranged to drive the gear 84 having the cam 83. All of this transmission constituting the bevel gears 93 and 94 and the pinion 99 are so arranged, in this particular instance, that the gear 84 and cam 83 rotates in exact synchronous rotation with that of the work spindle in such a way that the gear 84 makes four revolutions to one revolution of the work spindle 3, it being obvious that there are four sets of step threads on this particular piece of work. Other different types and numbers of step threads obviously would require other ratios of rotation of the gear 84 to the work spindle rotation.

One of the unique features of this invention is the setting of the cutting edge 100 of the cutting tool 64 a relatively large amount above the horizontal center line 101 of the lathe in order to provide more jumping clearance for the tool to clear the thread while chasing. This is best seen by particular reference to Figures XII and XIII. In the more conventional arrangement the cutting edge 100 of the tool is arranged to reciprocate in a direction indicated by the line 102, which passes through the axis of rotation 45 of the work and is substantially a radius from the center to the cutting edge of the tool. In applicant's case however, the reciprocation of the tool takes place in a line 103 which lies in a horizontal direction considerably above a horizontal center line 101 of the lathe so that the line of reciprocation 103 is not a radius but passes considerably above the center of rotation 45 of the work. In this way, greater jumping clearance is provided for the cutting edge 100 of the tool as it can be seen in the old or former method comparing Figures XII and XIII, that the tool is jumping from the smaller diameter thread to the larger diameter thread, which moves out the radius 102 to the position 104 whereas in the applicant's newer mode of operation, the cutting edge 100 of the tool moves along the line 103 out to the position 105. Noting particularly Figure XIII, the point 104 in the older method would be partly entered into the thread portion 8b, which would prevent moving the tool out along this slant of approach with the high speed of rotation of the work as is possible in this case, as it can be seen that the point 105 still does not contact the next thread 8b to be cut even though rotating at this relatively more rapid rate. It has thus been found that with this new arrangement that approximately fifty percent greater tool clearance is provided with the consequence increase spindle speed which can be obtained by this unique arrangement.

The operation of this step threading apparatus is substantially as follows:

The main drive motor 4 may be started or stopped at any time from the push button station 106 having the start push button 107 and the stop push button 108. Once the main drive motor 4 is started by operating the push button 107, it will continue to run at a relative high speed, in this instance 850 R. P. M. or at a relatively low speed, in this instance 200 R. P. M. The two speeds of the main drive motor are controlled by the relative position of the carriage 11 longitudinally of the bed 1 of the machine. The two speeds of the motor are electrically controlled by means of the main drive feed control limit switch 109 located on the front of the headstock as best seen in Figure I, which is actuated through a suitable actuating plunger 110 carried in a bracket 111 on the ways 9 of the bed 1 and which is engaged by the surface 112 of the carriage 11 so that this switch 109 will be actuated while the carriage is moved longitudinally to the left, as seen in this Figure I. The bracket 111 is so positioned on the ways 9 of the bed that the carriage will engage its plunger 110 in such a way that limit switch 109 will be actuated at the time when the carriage has just about moved to the end of the chasing cut to be made. Whereupon the motor will be reduced from its high to its relatively low speed of rotation. Thus the work spindle 3 is rotating at relatively slow speeds at the time of final cutting on the thread to be chased, the purpose of which being to facilitate more accurate and rapid stopping of the work spindle when the cutting tool has reached the exact end of the thread to be chased.

After the main drive motor has been started, the spindle does not rotate until the spindle start button 40 has been pressed which energizes solenoid 37 as described, operating the clutch in the driving pulley 5 to connect driving power from the motors to the pulley and to the headstock transmission to the work spindle 3. The tool carriage which in this arrangement initially starts at the right and feeds toward the left in chasing threads on this particular work piece, is fed from power from the main drive motor through the output shaft 25 of the headstock transmission and thus through the change gears 22, 23, and 24, and its feed screw 12 as described. At this time the single tooth clutch 19, Figure I, is normally held into engagement with the feed screw 12 by its spring 19a so that the carriage is fed simultaneously with the rotation of the work spindle 3 from the headstock transmission, the movement of the carriage and the work spindle taking place in synchronous movement. Also the drive to the cam 83 of the step threading attachment is driven through the various splined shafts and bevel gearing, as pointed out in Figures IV and VI in proper synchronous rotation with the work spindle so as to effect the proper jumping position for the cutting tool of the attachment during rotation of the work spindle.

As the carriage feeds along to the left, as shown in Figure I the limit switch 109 is actuated as described near the end of the thread to be chased so that at the last few revolutions of the work piece being chased, the work spindle will be rotated at relatively slow speed in this particular instance at about 1 R. P. M.

On the headstock 2 is mounted a bracket 113 which carries a positioning limit switch 114 which limit switch is arranged when it is actuated to energize solenoid 36 to thereby disengage the driving power from the main drive motor 4 to the pulley 5 and immediately effects the operation of the brake in said pulley to arrest rotation of the headstock transmission and the associated drive to the step threading attachment and the carriage 11. This limit switch 114 is actuated by a suitable dog 115 carried on the face 6a of the face plate 6 so that it is actuated for each revolution of the work spindle 3 and the face plate mounted thereon. However, this limit switch 114 is not effected though actuated until the limit switch 109 has first been actuated by movement of the carriage 11 to substantially the end of the chasing movement. The function of this switch therefore is that after the limit switch 109 has been actuated by movement of the carriage 11 thus bringing the motor to the relatively slow speed of rotation, the limit switch 114 will then become operative just after the switch 109 has become operative whereupon the headstock transmission will be stopped in driving action and instantly braked against further rotation by operation of solenoid 36 through the medium of the combined brake and clutch in the pulley 5, as pointed out. Furthermore by properly setting the trip dog 115 for the limit switch 114 substantially accurate stopping of the work spindle may be accomplished, as it is rotated at such relatively low speed that the rapid operation of the solenoid 36 effects the substantial instant breaking or stopping of the work spindle in a predetermined desirable position necessary for the running out of the thread into a drill hole or other movement of the cutting tool up against a shoulder on the work.

After the limit switch 114 has been tripped and the work spindle brought to accurate stopped position, the hand wheel 49 of the cross feed for the housing 43 of the step threading attachment is backed off so as to move the attachment out away from the work bringing the nut 54, Figure VII, against the bevel gear housing 52, stopping the unit at a proper relieved position. The "traverse right" push button 27, Figure I, is then pressed whereupon the solenoid 31 is energized which withdraws the single jaw clutch 19. The engaging of the clutch 19 through the medium of its lever arm 23 causes this arm 23 to engage a limit switch 116 which permits transmission of electrical power to the rapid traverse motor 18, so that when the button 27 is pressed the motor 18 is actuated for rotating the screw 12 in such a way as to rapidly rotate it for returning the carriage 11 to the right shown in Figure I. Immediately releasing the push button 27 causes the motor 18 to substantially instantly stop by dynamic braking so as to arrest the carriage 11 in position for another pass over the thread to be step chased. Pressing the control push button 26 can effect the "reverse traverse" of the motor 18 and the reverse movement in the carriage 11 and the disengagement of the clutch 19 through the solenoid 31 so that it is possible to rapid traverse the carriage more accurately up to position at the beginning of the thread in traversing the carriage to the left. As soon as either of the push buttons 27 or 26 have been released the clutch 19 again automatically engages in the correct position with the lead screw 12 through the medium of its automatic operating spring 19a. The cycle of operation may then be repeated by again pressing the spindle start button 40, the cutting tool 64 again going through the same cycle of operation with the slow down of the spindle near the end of the thread being chased and the final stopping of the spindle stopping by actuation of the limit switch 114 in proper accurate indexed position relative to the cutting tool, whereupon the "reverse traverse" button 27 is again pressed to return the tool after it has been withdrawn by the handwheel 49 to relieve it from the thread and it is traversed back to the initial starting position again.

Having thus fully set forth and described our invention, what we claim as new and desire to secure by United States Letters Patent is:

1. In a step threading mechanism, a rotatable work spindle, power means for rotating said work spindle, means for connecting or disconnecting said power means from said work spindle and for braking said work spindle against rotation when said power means is disconnected therefrom, a tool feeding device having feeding movement relative to said work spindle, means for feeding said tool carrier in a predetermined relationship to the rate of rotation of said work spindle, a tool on said tool carrier, means for reciprocating said cutting tool in step threading motion in synchronism with the rotation of said work spindle, means rendered effective by the movement of said tool carrier in feeding movement for changing the rate of speed of said power means for rotating said work spindle, and means operable by the rotation of said work spindle for rendering said spindle braking device operative for stopping said work spindle in a predetermined indexed position relative to said cutting tool.

2. In a step threading mechanism, a rotatable work spindle, power means for driving said work spindle, means for connecting or disconnecting said power means from the work spindle and for braking said work spindle against rotation when said power means is disconnected therefrom, a cutting tool, and means for feeding said cutting tool relative to a work piece mounted on said work spindle, said feeding means being arranged to move said tool carrier at a predetermined rate of travel relative to the rotation of said work spindle, means for reciprocating said cutting tool in step threading movement in synchronism with the rotation of said work spindle, means for moving said tool carrier at a rapid rate of travel relative to said work spindle, means for effecting different rates of rotation of said work spindle by said power driving means, and means operable by the rotation of said work spindle for stopping said work spindle in a predetermined indexed position relative to said cutting tool.

3. In a step threading mechanism, a rotatable work spindle, power means for rotating said work spindle, means for connecting or disconnecting said power means from said work spindle and for braking said work spindle against rotation when said power means is disconnected from said work spindle, a tool carrier, means for feeding said tool carrier relative to said work spindle, a cutting tool on said tool carrier, means for reciprocating said cutting tool in step threading movement in synchronism with rotation of said work spindle, means rendered effective by the rotation of said work spindle at the instant said power means is disconnected therefrom for rendering said braking means for said work spindle effective to stop it in a predetermined rotary position.

4. In a step threading mechanism, a rotatable work spindle, a tool feeding carriage movable relative to said work spindle, power means for rotating said work spindle at a plurality of different speeds, means operable by the movement of said carriage to effect said different rates of speeds for said power means, means for connecting or disconnecting said power means from said work spindle and for braking said work spindle against rotation when said power means is disconnected from said spindle, a cutting tool mounted on said carriage, means for reciprocating said cutting tool in step threading movement relative to a work piece in said work spindle, means for feeding said carriage relative to said work spindle in a predetermined rate relative to the rotation of said work spindle, and means operable by the rotation of said work spindle, effective when said carriage has moved to effect a change of speed in said power means, for operating said braking means for said work spindle to bring said work spindle to a stop in a predetermined circumferentially oriented position.

5. In a step threading mechanism, a rotatable work spindle, a tool feeding carriage movable relative to said work spindle, means for feeding said carriage at a predetermined rate of movement relative to the rotation of said work spindle, a cutting tool mounted on said carriage, means for reciprocating said cutting tool in step threading movement in synchronism with the rotation of said work spindle, power means for driving said work spindle at a relatively high speed and at a relatively low speed, means for rendering said high and low speed effective by the movement of said carriage, means for connecting or disconnecting said power means from said work spindle and for braking said work spindle against rotation when said power means is disconnected therefrom, and means operable by the rotation of said work spindle, when said carriage has moved to a position to effect low speed operation of said power means, for rendering said braking means for said work spindle effective to stop said work spindle at a predetermined position relative to said cutting tool on said carriage.

6. In a step threading attachment for lathe, a tool feeding carriage movable relative to a work piece to be step threaded in said lathe, a reciprocatable slide movable in synchronized step threading movement relative to work piece rotation in said lathe, a cylindrical tool bar mounted in said reciprocating slide with its axis parallel to the axis of rotation of said lathe, means for accurately adjusting said cylindrical tool bar parallel to the axis of rotation of said lathe, means for positioning said tool bar around its circumference in two positions, one position for internal threading operations and one position for external threading operations, and a cutting tool mounted in the outer end of said tool bar for operation on a work piece in said lathe, and means for mounting said cutting tool in said tool bar by means of the ground surface of sharpening of said tool so as to accurately locate said cutting tool for both internal and external step threading operations by said tool bar, said cutting edge of said cutting tool being mounted substantially above a horizontal plane passing through the axis of rotation of the work parallel to the direction of reciprocation of said cutting tool, so as to provide maximum clearance for said cutting edge of said tool when said work is being rotated at relatively high speed.

7. In a step threading attachment for lathe, a tool feeding carriage movable relative to the work spindle of said lathe, a reciprocating slide mounted on said carriage, means for actuating said slide in step threading movement comprising a gear, said gear having a cam on its face, a projection on said cam arranged to engage said reciprocating slide for moving it to and from the work to be step threaded, and a plane surface on the opposite face of said gear, said gear being journaled on a shaft for axial movement along said shaft, and means for axially moving said gear and its cam axially of said shaft in accurate adjustment so as to effect relative positioning of said reciprocating slide with respect to a work piece in said lathe, and means for driving said gear in accurate synchronous rotation with the work spindle of said lathe.

8. In a step threading mechanism, a rotatable work spindle, a tool carrier, a cutting tool mounted on said tool carrier with its cutting edge positioned well above the horizontal plane passing through the axis of said work spindle, and means for actuating said tool carrier during the cutting operation to reciprocate said cutting edge of said tool, in a plane substantially parallel to said first mentioned plane, perpendicular to the axis of rotation of the work spindle.

9. In a step threading mechanism, a rotatable work spindle, a tool carrier, a cutting tool mounted on said tool carrier with its cutting edge located well above the horizontal plane passing through the axis of rotation of said work spindle, and means for actuating said tool carrier during the cutting operation to effect reciprocating movement therein in a non-radial direction in a plane perpendicular to the axis of rotation of said work spindle.

WILLIAM F. GROENE.
ROSS M. BACON.